UNITED STATES PATENT OFFICE.

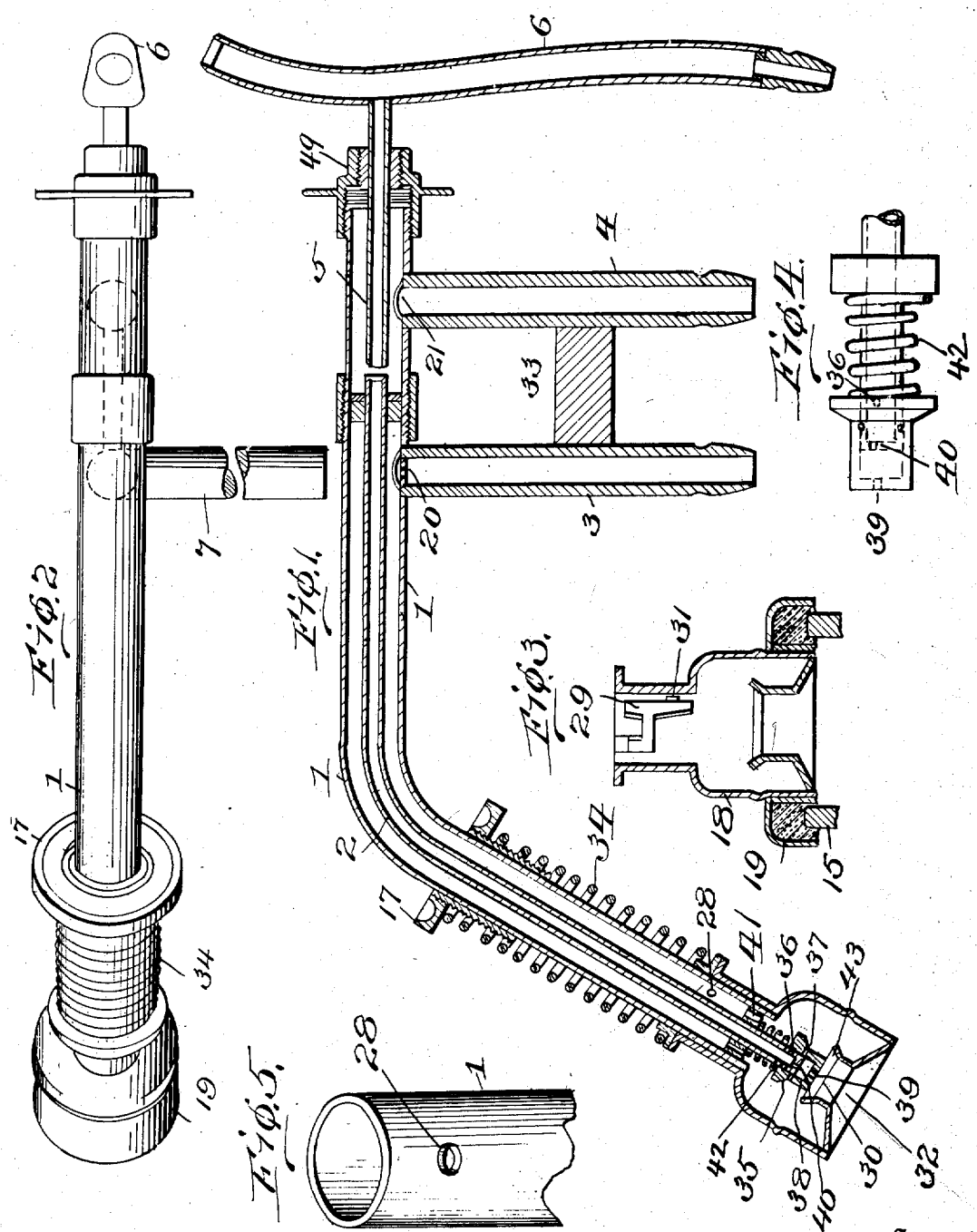

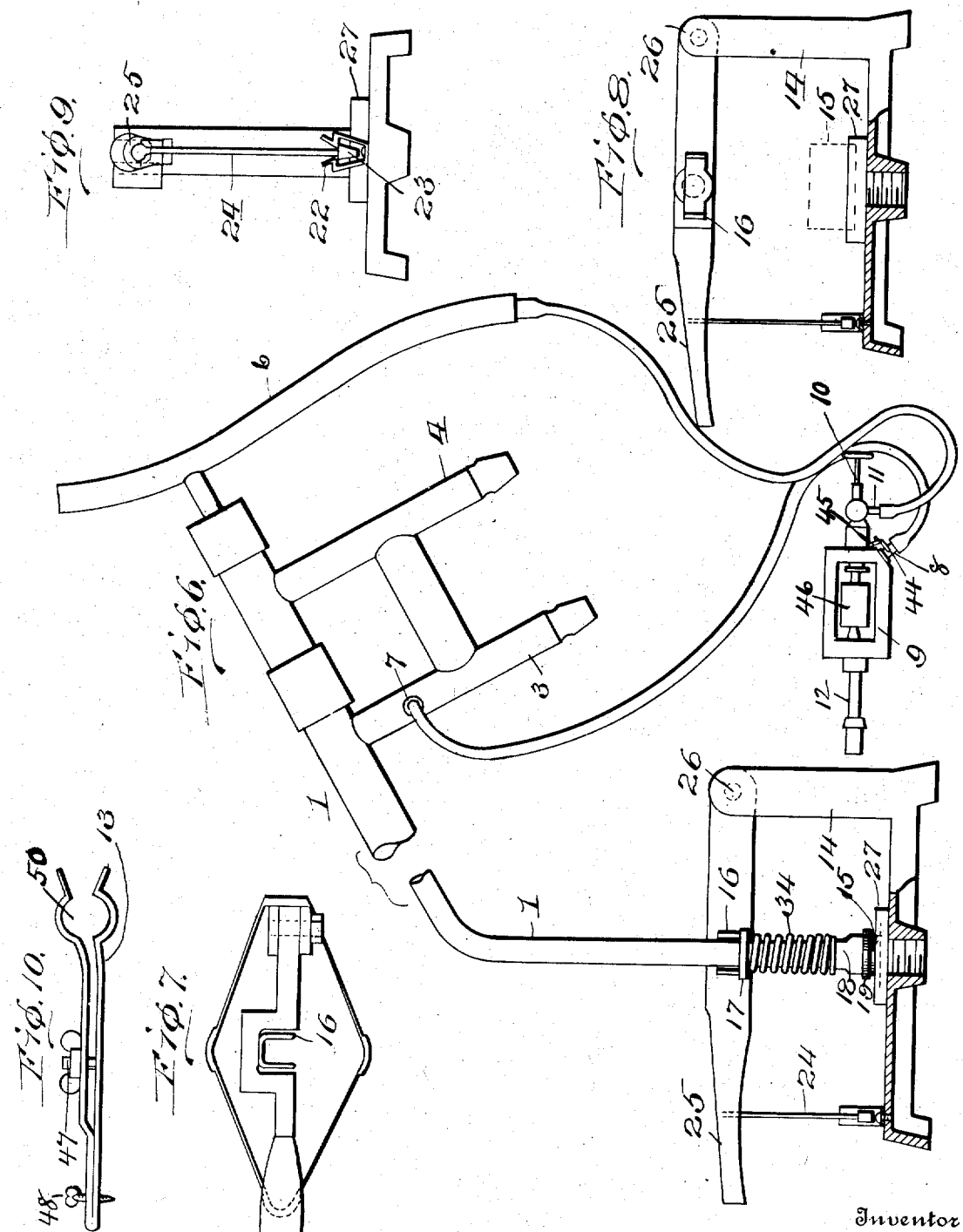

BERNARD L. KISSEL, OF JOPLIN, MISSOURI.

BLOWPIPE.

1,145,246.      Specification of Letters Patent.      Patented July 6, 1915.

Application filed September 9, 1912. Serial No. 719,428.

*To all whom it may concern:*

Be it known that I, BERNARD L. KISSEL, a citizen of the United States, residing at Joplin, in the county of Jasper and State of Missouri, have invented certain new and useful Improvements in Blowpipes, of which the following is a specification.

My invention relates to blowpipes, for use on metals that fuse only under the most intense heat; and more particularly for a blowpipe and clamping support for connecting it to a casting machine for use in casting dental inlays, and the like.

The object thereof is to so construct the device that it will mix natural gas or artificial gas with nitrous oxid; or gas and air, or a mixture of oxygen and hydrogen; or gasolene with air or nitrous oxid gas, as desired; and to regulate the flame and produce perfect combustion of the gases used.

A further object is to provide means for connecting it to a casting flask or the like, or to clamp it to a bench or table, in accordance with the nature of the work to be performed.

In the drawings forming a part of this specification, and in which like symbols of reference represent corresponding parts in the several views:—Figure 1 is a central longitudinal sectional view through the blowpipe; Fig. 2 a plan view of the blowpipe; Fig. 3 a detached sectional view of the hood as it appears connected to the flask; Fig. 4 a detail view of the adjustable tip; Fig. 5 a sectional view of the end of outer tube with pin, said pin being adapted to engage a slot in hood to control same; Fig. 6 a view of the blowpipe showing it connected to a nitrous oxid tank by means of a yoke, and blowpipe clamp in the act of casting; Fig. 7 is a plan view of the clamp for supporting and connecting it to a flask; Fig. 8 is a side view of the same; Fig. 9 is an end view; and, Fig. 10 is a view of clamp for connecting it to a bench, or the like.

The numeral 1 represents the blowpipe; 2 the inner or nitrous oxid tube; 3 the gas supply tube; 4 the air or nitrous oxid tube; 5 a hollow stem valve for connection with the nitrous oxid tube, the same adapted to be controlled by turning set nut 49 with thumb; 6 a nitrous oxid inlet tube adapted to be controlled as a stem valve; and 7 a bypass for connecting the device with a tube 8 on yoke 9, by means of a flexible pipe, and thus warm the valve 10 of the yoke.

11 is the outlet from the yoke 9, the same adapted to be connected by a flexible tube with tube 6; 12 a screw to secure the yoke to the oxid tank; 13 a clamp for connecting the handle tube 6 with a bench, or the like; and 14 is a blowpipe clamp for holding the blowpipe to the flask 15 in the casting operation, as illustrated in dotted lines.

16 is a clamp or clip for grasping the set-nut 17 of the blowpipe and holding packing ring 19 of the hood 18 on the flask 15, making the joint between blowpipe and casting flask.

20 is a duct leading from the gas supply pipe; 21 a complete opening in the air supply tube; and 33 a brace connecting tubes 3 and 4.

22, of Fig. 9, is a catch to receive and hold the head 23 carried by the rod 24 of the handle 25, as the same moves upon the hinge 26; and 27 is a coping or base on the clamp 14.

28 is a pin on the gas tube adapted to engage a slot 29 in the hood 18 and permit play thereon and govern the mixing point, which in the case of natural gas or gasolene is at the point 30. If the blowpipe is used in a manufacturing gas district the hood 18 is given a twist, sending pin 28 into slot 31, setting the mixing point at 32.

34 is a spring surrounding the gas pipe to hold the hood in its proper position with regard to the blowpipe and is adjustable by means of a set nut 17.

35 is a valve at the end of the nitrous oxid pipe 2, the same having orifices 36, which are adapted to register with similar orifices 37 in cap 38.

39 is an orifice in the cap; and 40 a similar orifice in the end of tube 2 to permit passage of the fluid therefrom, but not registering when closed.

41 are ports in the end of pipe 1 to permit passage of the fluid from the same; and 42 a spring to hold cap 38 in its proper position.

The part 43 of the hood forms a seat for the valve 35, when the device is used in casting.

44 is a burner on the yoke; 45 a shield for the same; and 10 the valve to control the tank 46.

47, of Fig. 10, is a screw for adjusting the clamp 13 to the blowpipe at 6; and 48 is a screw for connecting the clamp 13 to the work bench.

The operation of the device will be apparent from the foregoing description of the various parts and their interrelation. If the device is used for small solderings, such as simple bands, the bench clamp is brought into use. By setting the blowpipe up on its handle end and clamping it at 50 by the bench clamp it can be held in an upright position, or adjusted to any angle desired, by using by-pass tube 7 as a prop, so as to leave the hands of the operator free for his work. The stem valve 5 is closed and the tube 6 is used for air. When used for large solderings where natural gas is used the mixing point as before explained is governed by the pin 28 engaging slot 29, setting the proper mixing point at 30. When used with manufactured gas the hood 18 is given a twist sending pin 28 in slot 31 and thereby setting the mixing point for gas at 32. When used with gasolene the mixing point is the same as natural gas.

When used as casting device for dental inlays, the blowpipe clamp is used, the flask containing the mold is set on the coping of the blowpipe-clamp, the stem valve is made continuous with nitrous oxid supply tube, and the flame is directed on the metal in the mold. When the gold is at the proper molten state the handle of the clamp is brought down tight, engaging the catch, making the joint between the hood on the blowpipe and the flask, automatically seating the valves, closing the gas supply and the small flame valve 39, and opening the side valves 37, permitting an equal distribution of the nitrous oxid gas over the metal, the pressure of which forces it into the mold.

Having now fully described my invention, what I claim as new, and desire to secure by Letters-Patent, is:—

1. In a blowpipe, a main tube, a central tube disposed within the same, a hollow stem valve adapted to control the central tube and supply fluid thereto, and means for controlling the outlet of the central tube.

2. In a blowpipe, a central tube, a hollow stem valve to control the same, a tube surrounding the central tube, inlet tubes leading to the central and surrounding tube to conduct air and gas to the same, a hood connected to the end of the blowpipe, and means for controlling the supply and delivery of the various fluids.

3. In a blowpipe, internal and external tubes, inlets at the end and sides of said tubes for the fluids, lateral tubes leading to the inlets for air and gas, a stem valve to control the internal tube, a by-pass leading to the gas supply tube and acting as a support for the device, a yoke adapted to be connected to a tank, and means for connecting the by-pass with the same.

4. A blowpipe, consisting of an internal and an external tube, supply tubes for air and gas having connection to the same, a handle, a supply tube in the handle of the blowpipe, a hollow stem valve leading from the same and adapted to control the internal tube, and means for connecting the handle to a bench or the like.

5. A blowpipe, consisting of an internal tube, an external tube, means for supplying gas, air, and nitrous oxid to the tubes, a hood on the end of the external tube, a pin on the external tube, and a slot in the hood to receive the pin and adjust the hood and thus control the various fluids.

6. A blowpipe, consisting of an internal and external tube, a pin on the external tube, a hood formed with grooves in the same to receive the pin and control the relationship of the parts, a cap for the internal tube, said cap formed with lateral and front outlets, and lateral and front outlets in the internal tube to operate in conjunction with the cap outlets.

7. A blowpipe, consisting of internal and external tubes, means for conveying air, gas, and nitrous oxid to the same, a set nut on the outer tube, a frame to receive a receptacle, a vertical support on the same, and a clamp hinged to the support and adapted to engage the nut and hold the same to the receptacle.

8. A blowpipe, consisting of inner and outer tubes, inlets for air, gas and nitrous oxid at the sides and end of the tubes, a yoke for connecting the device to a tank, a by-pass leading from the blowpipe to the yoke to warm the nitrous oxid tank outlet, a cap on the end of the inner tube, outlets leading from the outer tube, a hood having an inturned flange, and a flange on the cap of the inner tube forming a valve adapted to be seated on the inturned flange.

9. A blowpipe, consisting of inner and outer tubes, a handle, an inlet tube in the handle, a hollow stem valve connected to the same and adapted to control the internal tube, a gas inlet leading to the outer tube, an outlet leading from the inner tube, an outlet leading from the outer tube, a hood, a spring surrounding the outer tube to control the hood, a pin on the outer tube, and grooves formed in the hood to receive the pin, by means of which the hood may be adjusted with reference to the outlets leading from the inner and outer tubes to change the mixing point of the gases.

10. A blowpipe, consisting of internal and external tubes, means for conveying air, gas, and nitrous oxid to the same, a stand for supporting the blowpipe, an upright standard extending from the base of the same, a lever connected to the standard for holding it on the stand, and means for securing the lever.

In testimony whereof I affix my signature in presence of two witnesses.

Dr. BERNARD L. KISSEL.

Witnesses:
    Horace Merritt,
    Eunice Barnard.